April 19, 1938.  C. R. HANNA  2,114,841
REGULATING SYSTEM
Filed April 16, 1936

WITNESSES:
C. J. Weller.
G. F. Bryant

INVENTOR
Clinton R. Hanna.
BY Ezra W. Savage
ATTORNEY

Patented Apr. 19, 1938

2,114,841

UNITED STATES PATENT OFFICE 2,114,841

REGULATING SYSTEM

Clinton R. Hanna, Pittsburgh, Pa., assignor to Westinghouse Electric & Manufacturing Company, East Pittsburgh, Pa., a corporation of Pennsylvania Application April 16, 1936, Serial No. 74,705

14 Claims. (Cl. 171—312)

My invention relates to regulators of the vibratory-contact type and it has particular relation to means for improving the performance characteristics of high precision voltage regulators of this class.

One object of my invention is to eliminate overshooting of regulating actions without impairing the speed of response or lowering the sensitivity of such regulators.

Another object is to provide stabilizing means, the operation of which enhances the response characteristics of the regulator.

A further object is to provide a circuit for effecting contact vibration which prevents changes in regulated-machine excitation from altering the regulator calibration.

In practicing my invention, I achieve the objects first named by supplying to the winding which controls cooperation of the regulator contacts a stabilizing current which is proportional to the rate of change of the regulated quantity, and I achieve the object last named by excluding from the contact-driving circuit the excitation-determining winding which the regulator controls.

My invention itself, together with additional objects and advantages, will best be understood through the following description of specific embodiments thereof when taken in conjunction with the accompanying drawing in which.

Figure 1:
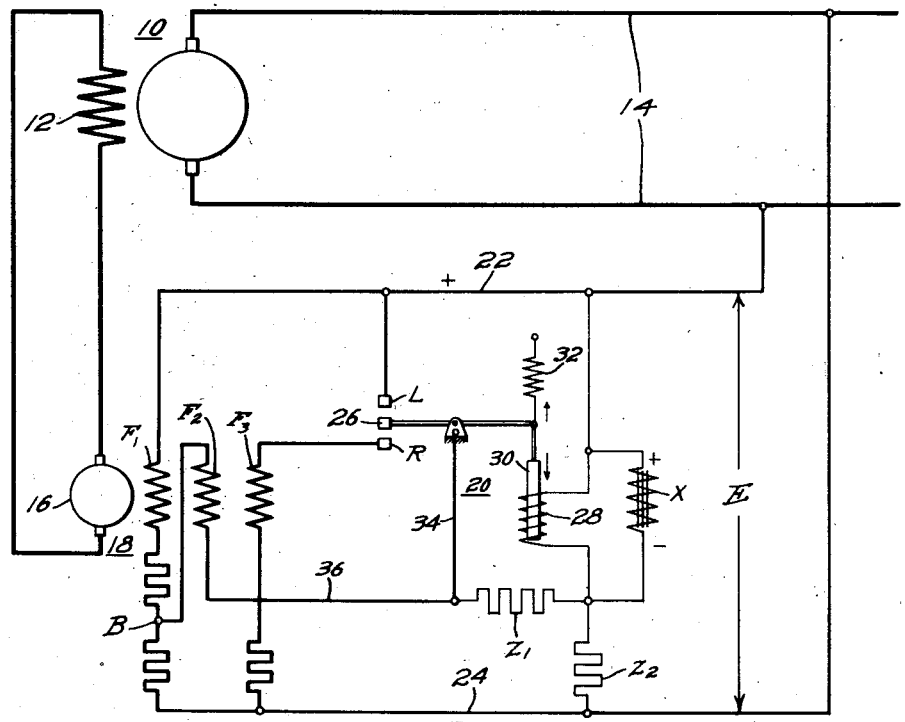
Figure 1 is a diagrammatic view of apparatus and circuits showing the improvements of my invention applied to a vibratory-contact voltage regulator for a direct-current generator.

Referring to Fig. 1 of the drawing, I have there illustrated a direct-current generator 10 having a field winding 12 and being connected to an output circuit 14. Energizing current is supplied to the field winding from the armature 16 of a separate exciting generator 18 illustrated as being provided with a plurality of field winding sections $F_1$, $F_2$ and $F_3$.

For the purpose of maintaining constant the voltage which machine 10 supplies to the circuit 14 under varying conditions of loading, generator driving speed, and the like, a vibratory contact regulator 20 may be applied in the manner indicated in Fig. 1 to control the effective energizing currents supplied to the exciter field winding sections $F_1$—$F_3$. In the system represented, this current is supplied from the regulated circuit 14 through conductors 22 and 24.

Regulator 20 is of the so-called double range type wherein a movable contact member 26 selectively cooperates with a stationary member L or with a second stationary member R depending upon the excitation requirements of the regulated machine 10. The position of movable member 26 is determined, in the arrangement shown, by a solenoid 28 which, when energized by a measure E of the voltage of regulated circuit 14, causes a plunger 30 to exert a downwardly acting pull in opposition to the upwardly acting force of a tension spring 32.

This spring tends to bias the contact 26 into engagement with stationary member R, thereby completing a connection through which all three winding sections $F_1$, $F_2$ and $F_3$ are serially energized by the voltage E. Under this condition the effects of these three windings are additive and maximum excitation is supplied through exciter 18 to the regulated machine 10.

When, however, the solenoid 28 biases contact member 26 out of engagement with stationary member R, winding section $F_3$ is disconnected from the source of energization, and section $F_2$ passes only a comparatively small value of energizing current through a circuit which includes a pair of impeders $Z_1$ and $Z_2$. Under this condition, the excitation of exciter 18 is supplied almost entirely by winding section $F_1$, and the excitation of machine 10 is maintained at a correspondingly intermediate value.

Finally, when contact 26 is biased into engagement with stationary member L, there is completed a circuit, including conductors 34 and 36, through which voltage E supplies field winding section $F_2$ with a reversed current which causes section $F_2$ to oppose the comparatively constant magnetizing effect of section $F_1$. Under this condition, of course, the exciter excitation is of a minimum value and may even be caused to reverse by making field winding section $F_2$ stronger than section $F_1$.

In operation of the regulating system illustrated, the circuit 22—24 impresses upon solenoid winding 28 a measure of the generator voltage E. When this voltage is of the normal or desired value, the movable contact member 26 is caused continually to engage and disengage, in a manner to be explained presently, with either one of the stationary members R or L, and control or adjustment of the voltage of the regulator E is effected by the well known variation of the ratio of engaged to disengaged periods.

When the operating conditions of machine 10 are such as to require relatively heavy excitation, member 26 cooperates with the stationary contact member R and continues so to do until the excitation requirements are reduced below a given intermediate value, at which time cooperation is shifted to stationary member L.

Upon a decrease below the desired value in regulated voltage E, the ratio of the engaged to disengaged contact periods changes in a manner to cause exciter 18 to increase the excitation of machine 10. When the cooperation of movable contact member 26 is with stationary member L, these engagement periods decrease in length and when the cooperation is with stationary member R, the engagement periods increase in length, thereby effecting the rise in exciter excitation needed to correct the voltage of generator 10 back to the desired value.

Upon an increase in the voltage of circuit 14 above the desired value, the ratio of the engaged to disengaged contact periods changes in the opposite manner, thereby to decrease the machine excitation by an amount sufficient to lower the voltage E back to the desired value. When cooperation is with member L, the engagement periods increase their length, and when with member R, they similarly decrease their length.

One feature of my invention relates, as is pointed out in an earlier portion of this specification, to improvements in the circuit which causes to be effected the described vibratory action of the contacts which in practice may attain a frequency of the order of 100 engagements per second. My improved contact driving circuit, as illustrated in Fig. 1, includes whichever of the two stationary contacts L and R is active, the movable cooperating member 26, conductor 34, the resistor or other impeder $Z_1$, and the impeder $Z_2$. This latter impeder forms a part of the circuit through which solenoid winding 28 is supplied with a voltage directly determined by the magnitude of potential E acting in the regulated circuit 14.

When the engagement by the movable contact member 26 is with stationary member L, current flows from the positively energized conductor 22 through members L and 26, conductor 34 and impeder $Z_1$ and impeder $Z_2$ to the negatively energized conductor 24. This increases the voltage drop through impeder $Z_2$ and thereby reduces the measure of voltage E impressed upon solenoid winding 28, reduces the downward pull of plunger 30 and allows spring 32 to separate the contacts. Once separated the current flow through driving impeder $Z_1$ is interrupted, the voltage drop across impeder $Z_2$ reduces it to its former value, and solenoid 28 accordingly returns contact 26 back into engagement with member L. A repetition of this sequence causes the aforementioned rapid vibration of contact 26.

Similarly, when cooperation is with member R, as long as the contacts are separated, voltage E passes from conductor 22 through windings $F_1$ and $F_2$ and the impeder $Z_1$ a current through impeder $Z_2$ which is of appreciable value. When member 26 engages with member R this completes, through winding $F_3$, a bypass circuit which diverts a portion of this current from impeder $Z_2$, thereby decreasing the voltage drop thereacross.

The resulting increase in voltage applied to solenoid 28 overcomes the action of spring 32 and separates member 26 from member R. This interrupts the bypass circuit and a repetition of the sequence of operations just named takes place to cause the previously described contact vibration.

All previously utilized contact driving circuits with which I am familiar have required that the high frequency "buzzer" current passed through impeders $Z_1$ and $Z_2$ be conducted through one or more of the exciter field winding sections. This is objectionable because of the high reactive impedance of such windings and also because the changing current in the exciter field sections occasioned by differing operating conditions of the regulated machine 10 exerts a marked influence upon the calibration of the regulator. In consequence it became impossible to keep the point of regulation constant when the excitation variation was large.

The driving circuit of my invention overcomes these and other objections of the prior art. Its exclusion from the active buzzer circuit of the field winding sections permits the regulator calibration to be entirely uninfluenced by changes in operating conditions of the regulated machine.

The second feature of my invention has to do with the elimination of hunting or overshooting of corrective actions instituted by the regulator. The system of voltage regulation disclosed in Fig. 1 employs, in the form of vibratory contacts and the exciter field winding sections controlled thereby, a means of amplification which causes large changes in generated voltage for small departures in terminal voltage. One of the chief difficulties with precision voltage regulators of this class is oscillation or hunting.

I have discovered, from theoretical calculations which I am able to substantiate by experimental data, that for every such system certain conditions of stability exist, and my investigations have indicated that an unstable system may be made stable either by making its response to changes more sluggish or by making it more rapid. My solution to the problem now about to be explained is based upon the latter approach, and preferably is carried out by making the amplifying portion of the regulating system responsive to the rate of change of voltage or other quantity variation in addition to the changes themselves.

In the system of Fig. 1 the vibratory contact control element 20 is the device comprised by the amplifier of the regulator to which I supply the rate of change of proportional current for the purpose of effecting stability. By virtue of its direct connection with the circuit 22—24, the solenoid winding 28 is supplied with the usual current directly proportional to the measure E of the regulated quantity.

In order additionally to supply to this winding a stabilizing current which varies with the direction and rate of change of voltage E, I associate therewith an energy-storing element which may take the form of a parallel-connected choke coil or inductor X which preferably has low resistance and high inductance as compared to the corresponding constants of the regulating coil 28. Preferably, also, the resistance of the impeder $Z_2$ is large as compared to that of the inductor X. It may, however, be somewhat comparable to that of winding 28.

The net effect of this circuit arrangement is to supply to the winding 28 a current which varies directly with the rate of change and inversely as the direction of change of the regulated quantity E, this, as already explained, being in addition to the major controlling current which is directionally proportional to the named measure of regulated quantity.

In my belief, the explanation for this action lies in the energy which is stored in the magnetic field which surrounds the inductor X. As long as the impressed voltage E remains constant, this field does not change and the current drawn by element X is likewise of a fixed value. When, however, the voltage E decreases and causes winding 28 to institute a voltage increasing corrective action, the energy stored in the magnetic field of inductor X tends to sustain the voltage originally appearing thereacross with the result that a component of current flows from the inductor X as a source through the winding 28 which anticipates the result of the regulator action caused by the drop in voltage E, and introduces a force to interrupt this regulator action sooner than it otherwise would be.

Similarly, when the regulated quantity E increases in value and causes winding 28 to institute a voltage lowering corrective action, the inductor X absorbs more than its proportional division of current in the circuit of which it forms a part, in building its store of magnetic value up to a new value, and by thus opposing, in effect, the increase in current through winding 28, also interrupts the quantity raising corrective action before overshooting occurs. It will thus be seen that the inductor X causes each successive regulator corrective action to start sooner than it otherwise would, thus shortening the time when the voltage E is rising above or falling below its desired value and consequently decreasing the amount of such variations from the desired value.

In each of the above described situations, the modifying action is proportional to the rate of change of voltage E, it being high when the change is rapid and correspondingly lower when the change is more gradual. The benefits accruing from this anticipating characteristic are material. Not only are resonances present with ordinary circuits entirely eliminated by the addition of this rate of change of response, but the speed of regulator response is improved and the regulator sensitivity is not in the least degree lowered.

Figure 2:
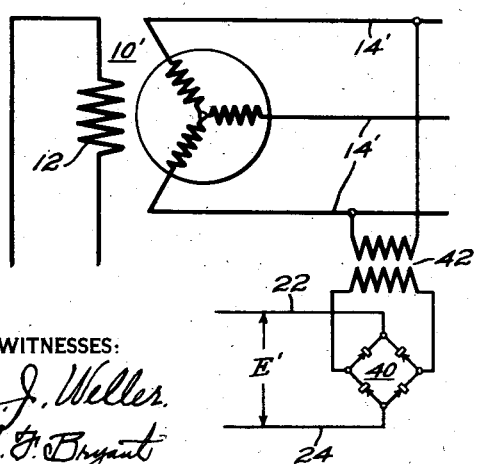
Fig. 2 is a partial reproduction of the system of Fig. 1 showing its adaptation to an alternating-current generator.

The regulating system of Fig. 1, incorporating the improvements of my invention just explained, is capable of application not only to direct-current machines, but may also be applied with equal success to alternating-current machines. One such application is represented in Fig. 2.

In order to supply the required quantity proportional voltage E' to the circuit 22—24, I connect between this circuit and the conductors of the output circuit 14', supplied by the alternating-current machine 10' to be regulated, a rectifier 40. If desired, a transformer 42 may also be included in the rectifier supply circuit.

In operation, the disclosed connection impresses upon the circuit 22—24 a uni-directional voltage E' which energizes the regulating equipment in the same manner as does voltage E of the system of Fig. 1. In some cases of application to an alternating-current machine, the previous explained contact driving circuit involving impeder $Z_1$ may be dispensed with, in which case the polarized pulsations in the rectified voltage E' may be utilized to vibrate the regulator contacts. In other cases, however, the usual "buzzer" control may be found desirable to intensify this vibration.

Figure 3:
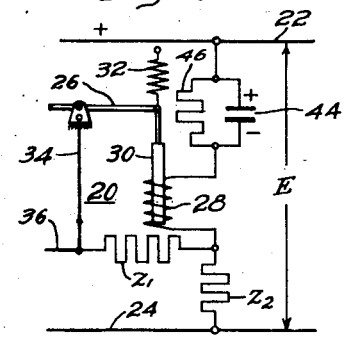
Fig. 3 is a diagrammatic representation of an alternate method of supplying to the contact-actuating solenoid of Fig. 1 a stabilizing current which is proportional to the rate of change of the regulated quantity.

In Fig. 3, I have illustrated a second manner in which a stabilizing current proportional to the direction and rate of change of the regulated quantity E may be supplied to the regulator control winding 28. Here, instead of using an inductor X connected in parallel circuit relation with the winding, I utilize an energy-storing element in the form of a capacitor 44 which, together with a resistor 46, is connected in series circuit relation in the winding energizing circuit. The benefits obtainable by the use of this arrangement are entirely comparable to those afforded by the system of Fig. 1.

In operation, the resistor passes the usual "quantity proportional" current, while the capacitor 44 causes the "rate of change proportional" stabilizing current to flow through the control winding 28. Preferably, the impedance of this winding should be kept low as compared to that of the capacitor and resistor combination.

When quantity E decreases, for example, the energy stored in the electrostatic field associated with the capacitor supplies an additively related current to the winding 28 which prematurely interrupts the resulting quantity rising corrective action. Similarly, when quantity E increases, capacitor 44 draws a charging current, the effect of which similarly is to cause winding 28 prematurely to interrupt the resulting quantity-lowering action.

Although I have shown and described certain specific embodiments of my invention, I am fully aware that many modifications are possible. My invention, therefore, is not to be restricted, except insofar as is necessitated by the prior art and by the scope of the appended claims.

I claim as my invention:

1. In a regulating system comprising a pair of contact members adapted rapidly to engage and disengage, quantity-adjusting means controlled thereby, means, including a winding, for controlling said contact cooperation, and a direct current circuit, including said winding, energized by a unidirectional voltage proportional to the regulated quantity, the combination of an energy-storing element connected in parallel-circuit relation with said winding whereby to supply thereto a current which varies with the direction and rate of change of the aforementioned quantity-proportional voltage.

2. In a regulating system comprising a pair of contact members adapted rapidly to engage and disengage, quantity-adjusting means controlled thereby, means, including a winding, for controlling said contact cooperation, and a direct current circuit, including said winding, adapted to be energized by a unidirectional voltage proportional to the regulated quantity, the combination of stabilizing means in the form of an impeder also included in said circuit and an inductor connected in parallel-circuit relation with said winding whereby to supply thereto a current which varies with the direction and rate of change of the aforementioned quantity-proportional voltage.

3. In a regulating system comprising a pair of contact members adapted rapidly to engage and disengage, quantity-adjusting means controlled thereby, means comprising a direct current circuit including a winding energized by a unidirectional voltage proportional to the regulated quantity for controlling the operation of said contact members, the combination of an impeder serially connected in said circuit and an energy-storing element connected in parallel-circuit relation with said impeder whereby to supply to said winding a current which varies with the direction and rate of change of the aforementioned quantity-proportional voltage.

4. In a regulating system comprising a pair of contact members adapted rapidly to engage and disengage, quantity-adjusting means controlled thereby, means comprising a direct current circuit including a winding energized by a unidirectional voltage proportional to the regulated quantity for controlling the operation of said contact members, the combination of stabilizing means in the form of an impeder serially connected in said circuit and a capacitor connected in parallel-circuit relation with said impeder whereby to supply to said winding a current which varies with the direction and rate of change of the aforementioned quantity-proportional voltage.

5. In a regulating system for a dynamo-electric machine comprising an excitation-determining field winding, a direct current circuit energized by a unidirectional voltage that is a measure of the machine voltage for supplying current to said field winding, a pair of contact members for controlling said current, and a solenoid, energizably connected with the aforementioned circuit, for determining the engagement of said contact members, the combination of means for causing the contact members rapidly to engage and disengage comprising an impeder included in said solenoid energizing connection and a circuit controlled by the contact members and not including said field winding for passing additional current through said impeder.

6. In a regulating system for a dynamo-electric machine comprising an excitation-determining field winding, a direct current circuit energized by a unidirectional voltage that is a measure of the machine voltage for supplying current to said field winding, a pair of contact members for controlling said current, and a solenoid, energizably connected with the aforementioned circuit, for determining the engagement of said contact members, the combination of means for causing the contact members rapidly to engage and disengage comprising an impeder included in said solenoid energizing connection and a second energizing connection of said impeder with said circuit wherein is included the said contact members and a second impeder and from which said field winding is excluded.

7. In a regulating system, in combination, cooperating contact members and quantity adjusting means controlled thereby, means for controlling the operation of said contact members comprising a control circuit including a solenoid, means for continuously applying a unidirectional voltage to said control circuit that is a measure of the regulated quantity for supplying a component of current to said solenoid the value of which is a measure of the quantity being regulated, and means including an energy storing element connected in said control circuit and effective upon a departure of the current therein from its desired value for hastening the return of the current therein to its desired value more rapidly than if controlled by the regulated quantity alone.

8. In a regulating system, in combination, cooperating contact members and quantity adjusting means controlled thereby, means for controlling the operation of said contact members comprising a direct current control circuit including a solenoid, means for continuously supplying a component of unidirectional current to said solenoid the value of which is a measure of the quantity being regulated, and energy storing means in said control circuit effective upon a departure of the current therein from its desired value to receive energy from, or deliver energy to, said solenoid at a rate measured by the rate of change of the regulated quantity from its desired value for effecting a more rapid return of the current in the solenoid to its desired value than if influenced by the regulated quantity alone.

9. In combination, an electric circuit, means for regulating an electric quantity of said circuit comprising a vibrating regulator having cooperating contact members and an actuating winding for effecting the rapid engagement and separation of said contact members, means for passing a unidirectional current through said actuating winding having a regulating component that is a measure of the regulated quantity and an anti-hunting component of current that is a measure of the direction and rate of change of the regulated quantity from its desired value.

10. In combination, an electric generator, means for regulating the voltage of said generator comprising a vibrating regulator having cooperating contact members and an actuating winding for effecting the rapid engagement and separation of said contact members, means for passing a unidirectional current through said actuating winding having a regulating component that is a measure of the regulated voltage and an anti-hunting component of current that is a measure of the direction and rate of change of the regulated voltage from its desired value.

11. In a regulator system for a dynamo-electric machine comprising a plurality of excitation determining field windings and a control element having two stationary contact members, a movable contact member, and means for actuating said movable contact member into and out of engagement with either of said fixed contact members comprising a solenoid and a direct current control circuit including said solenoid to which a unidirectional voltage is applied that is a measure of the regulated quantity, said control circuit including an impeder in series circuit relation with said solenoid, and a connection from the movable contact member to a point in said control circuit for varying the current through said impeder upon engagement and disengagement of said movable contact member with said fixed contact members.

12. In a regulator system for a dynamo-electric machine comprising a plurality of excitation determining field windings and a control element having two stationary contact members, a movable contact member, and means for actuating said movable contact member into and out of engagement with either of said fixed contact members comprising a solenoid and a direct current control circuit including said solenoid to which a unidirectional voltage is applied that is a measure of the regulated quantity, said control circuit including an impeder in series circuit relation with said solenoid, a connection from the movable contact member to a point in said control circuit for varying the current through said impeder upon engagement and disengagement of said movable contact member with said fixed contact members, and means connected in said control circuit and effective upon a departure of the regulated quantity from its desired value for introducing a component of current into said solenoid in opposition to the current change caused by variation in said quantity.

13. In a regulating system, in combination, cooperating contact members and quantity adjusting means controlled thereby, means for controlling the operation of said contact members comprising a direct current control circuit including a solenoid, means for applying a unidirectional voltage to said control circuit that is a measure of the regulated quantity for supplying a component of direct current to said solenoid the value of which is a measure of the quantity being regulated, and energy storing means comprising an inductor connected in parallel circuit relation to said solenoid for introducing a component of current therethrough in opposition to the current change caused by variation in the regulated quantity from its desired value.

14. In a regulating system, in combination, cooperating contact members and quantity adjusting means controlled thereby, means for controlling the operation of said contact members comprising a direct current control circuit including a solenoid, means for applying a unidirectional voltage to said control circuit that is a measure of the regulated quantity for supplying a component of direct current to said solenoid the value of which is a measure of the quantity being regulated, and energy storing means comprising a resistor and a condenser connected in parallel circuit relation to each other and in series circuit relation with said solenoid for introducing a component of current therethrough in opposition to the current change caused by variation in the regulated quantity from its desired value.

CLINTON R. HANNA.